United States Patent
Kroeze et al.

(10) Patent No.: US 11,318,600 B2
(45) Date of Patent: May 3, 2022

(54) ADJUSTABLE GRIPPING DEVICE

(71) Applicant: Kroeze Koncepts, Inc., Lakewood, CA (US)

(72) Inventors: Steven H. Kroeze, Lakewood, CA (US); Theodore V. Tillinghast, Carlsbad, CA (US)

(73) Assignee: Kroeze Koncepts, Inc., Lakewood, CA (US)

( * ) Notice: Subject to any disclaimer, the term of this patent is extended or adjusted under 35 U.S.C. 154(b) by 0 days.

(21) Appl. No.: 16/938,487

(22) Filed: Jul. 24, 2020

(65) Prior Publication Data
US 2022/0024025 A1    Jan. 27, 2022

(51) Int. Cl.
*B25J 1/04*    (2006.01)

(52) U.S. Cl.
CPC ........................... *B25J 1/04* (2013.01)

(58) Field of Classification Search
CPC ................ B25J 1/02; B25J 1/04; A47F 13/06
USPC ......................... 294/209, 210, 100
See application file for complete search history.

(56) References Cited

U.S. PATENT DOCUMENTS

| 1,531,567 | A  | * | 3/1925  | Niblock ............. H01H 85/0208 81/3.8 |
|---|---|---|---|---|
| 3,986,743 | A  | * | 10/1976 | Bjurling ..................... A61F 2/64 294/100 |
| 6,739,637 | B2 | * | 5/2004  | Hsu .......................... B25G 3/18 294/115 |
| 6,848,731 | B2 | * | 2/2005  | Khubani .................... B25G 1/06 16/328 |
| 7,665,782 | B2 | * | 2/2010  | Buzby .................... E01H 1/1206 294/109 |
| 7,677,619 | B2 | * | 3/2010  | Hutchings ............ B25J 11/0025 294/105 |
| 7,934,756 | B2 |   | 5/2011  | Kroeze |
| 8,061,751 | B2 | * | 11/2011 | Hatcher ..................... B25J 1/04 294/209 |
| 8,469,426 | B2 | * | 6/2013  | Lofley, Sr. ............... B25G 1/04 294/210 |
| 9,056,393 | B1 | * | 6/2015  | Gary ....................... F21V 19/04 |
| 9,363,990 | B2 | * | 6/2016  | Squires ................. A01M 31/02 |
| 9,592,066 | B2 | * | 3/2017  | Kovarik .................. B26B 17/02 |
| 2006/0062632 | A1 | * | 3/2006 | Jang ......................... E04H 15/46 403/109.6 |
| 2014/0054912 | A1 | * | 2/2014 | Bustos ..................... B25B 9/00 294/190 |

* cited by examiner

*Primary Examiner* — Dean J Kramer
(74) *Attorney, Agent, or Firm* — Klein, O'Neill & Singh, LLP (57) ABSTRACT

An adjustable gripping assembly having a first or holding end with a trigger assembly rotatably held therein and connected to a wind assembly having a flexible, non-resilient link held by one end therein for operating a pair of gripping elements, movably mounted on a distal end of an adjustable, multipart hollow body. The trigger assembly including a trigger lock thereon and the multipart body including telescoping locking element mounted on the telescoping joints to control adjustment of the length of the assembly when the portions of the multipart body are moved with respect to each other. And, a pivot joint formed on an outer end of the multipart body, adjacent the pair of gripping elements to allow the gripping elements to be pivoted to different angles on the outer end upon release of a locking element held in the pivot joint.

13 Claims, 7 Drawing Sheets

ADJUSTABLE GRIPPING DEVICE

BACKGROUND OF THE INVENTION

1. Field of the Invention

This invention relates generally to gripping devices, and more particularly, to an adjustable gripping device that is more adaptable, functional and easier to use, particularly in areas that are difficult to reach.

2. Description of Related Art

Many types of devices are used by people to extend their reach and to pick up and/or grip items that are not within their reach, or which are not readily available to them for any number of reasons. Many of the available devices, however, are not adjustable or extendable, nor can they be made so. Moreover, the available devices that claim to be adjustable or extendable, tend to be complex, expensive, hard to use and/or not readily available for use by all persons, nor actually work as claimed, nor can reach hard to access areas. Therefore, there is a long felt need in the art for an easily used gripping device which is readily available, easy to use and which is easily adjusted and manipulated to use in hard to access or reach places.

An adjustable gripping device is set forth in U.S. Pat. No. 7,934,756 ("'756"), in the name of Steven H. Kroeze, one of the inventors named herein. The disclosure of this '756 patent is incorporated, in its entirety, by this reference thereto. Although the gripping device described in this patent is very handy and useful, it cannot be used to grip and/or pick-up all types of items held in inconvenient places and does not include a pivoting portion that allows it to be used in all gripping and carrying situations, particularly those wherein an object to be picked up is too high, or behind a barrier, such as a fence, gate, wall, or the like. There, therefore, exists a need in the gripping and carrying art for a relatively inexpensive to manufacture, gripping device usable by a variety of different people, and which is adjustable in length and in which the gripping end may be selectively pivoted so that it may be more easily adjusted to different angles and manipulated and operated to allow a user to grip and/or manipulate a large variety of objects in different positions, that might normally be out of reach or inaccessible.

SUMMARY OF THE INVENTION

Accordingly, it is a general object of the present invention to provide an improved gripping device. It is a particular object of the present invention to provide an improved, substantially low cost gripping device having movable gripping elements at an outer end thereof. It is a still more particular object of the present invention to provide an improved gripping device which is adjustable in length and includes novel telescoping locking means. It is a still more particular object of the present invention to provide an improved adjustable gripping device that enables a user to grip and manipulate distant objects. It is a still further particular object of the present invention to provide an improved adjustable gripping device that may have its gripping end pivoted to different angles to allow a user to grip and/or manipulate a large variety of objects that would be out of reach or inaccessible when using known gripping devices. And, it is a final particular object of the present invention to provide an easily used adjustable gripping device having a rotatable and lockable trigger mounted on a holding end to operate a pair of gripping elements mounted at a distal end by means of an operating system held within an extendable body of the device, and which adjustable gripping device is especially versatile.

In accordance with one aspect of the present invention there is provided an improved gripping assembly having an adjustable hollow body with a first, handle or holding end having a rotatable operating element held therein and which is operatively connected to adjustable gripping elements, movably mounted on a distal end of the adjustable hollow body. A further aspect of the present invention provides for the gripping end of the device to be selectively pivoted to different angles.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in conjunction with the accompanying drawings, wherein like reference numerals are used throughout the several views, and, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the instant invention have been defined herein specifically to describe an improved, adjustable gripping device assembly having a plurality of adjustable body portions, a holding or operating end, telescoping locking means for more securely adjusting the length of the device, and a pivoting gripping end. It is to be understood that the device may be custom made of any desired material(s), in any desired length or size depending on its intended use.

The gripping assembly is generally indicated at 10 and comprises an elongated hollow body or housing 12, having at least two body portions, such as a first body portion 14, adjustably, telescopically mounted over or within a second body portion 16. Additionally, either or both body portions 14, 16 may be shaped differently, if desired, and may include a further telescoping portion, for example, as shown at joint 11 in body portion 14 and joint 11a in body portion 16.

Figure 7:
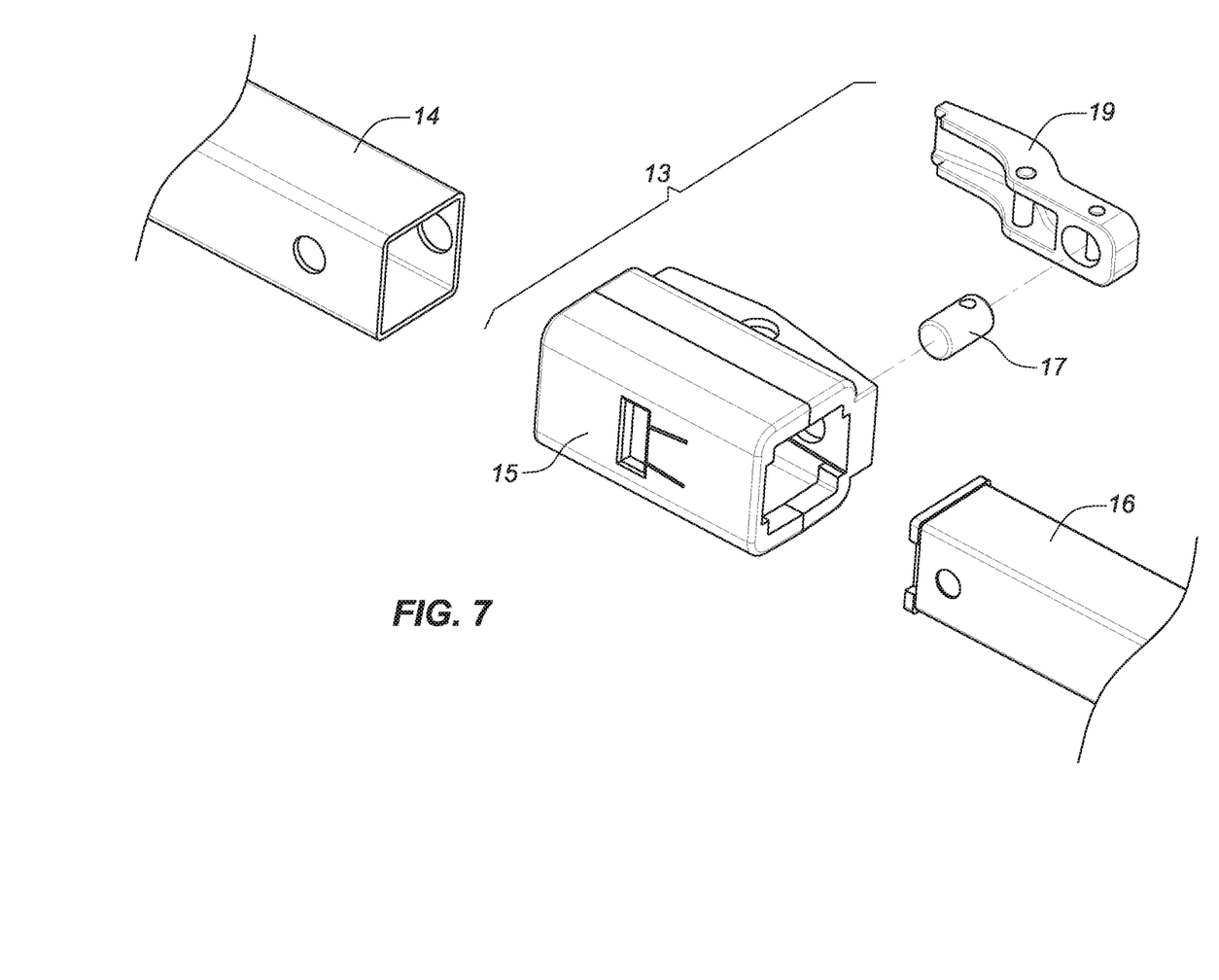
FIG. 7 is an enlarged, partial exploded perspective view of a telescoping length adjusting locking means of the gripping device of the instant invention, shown in FIGS. 1-4.
Figure 8:
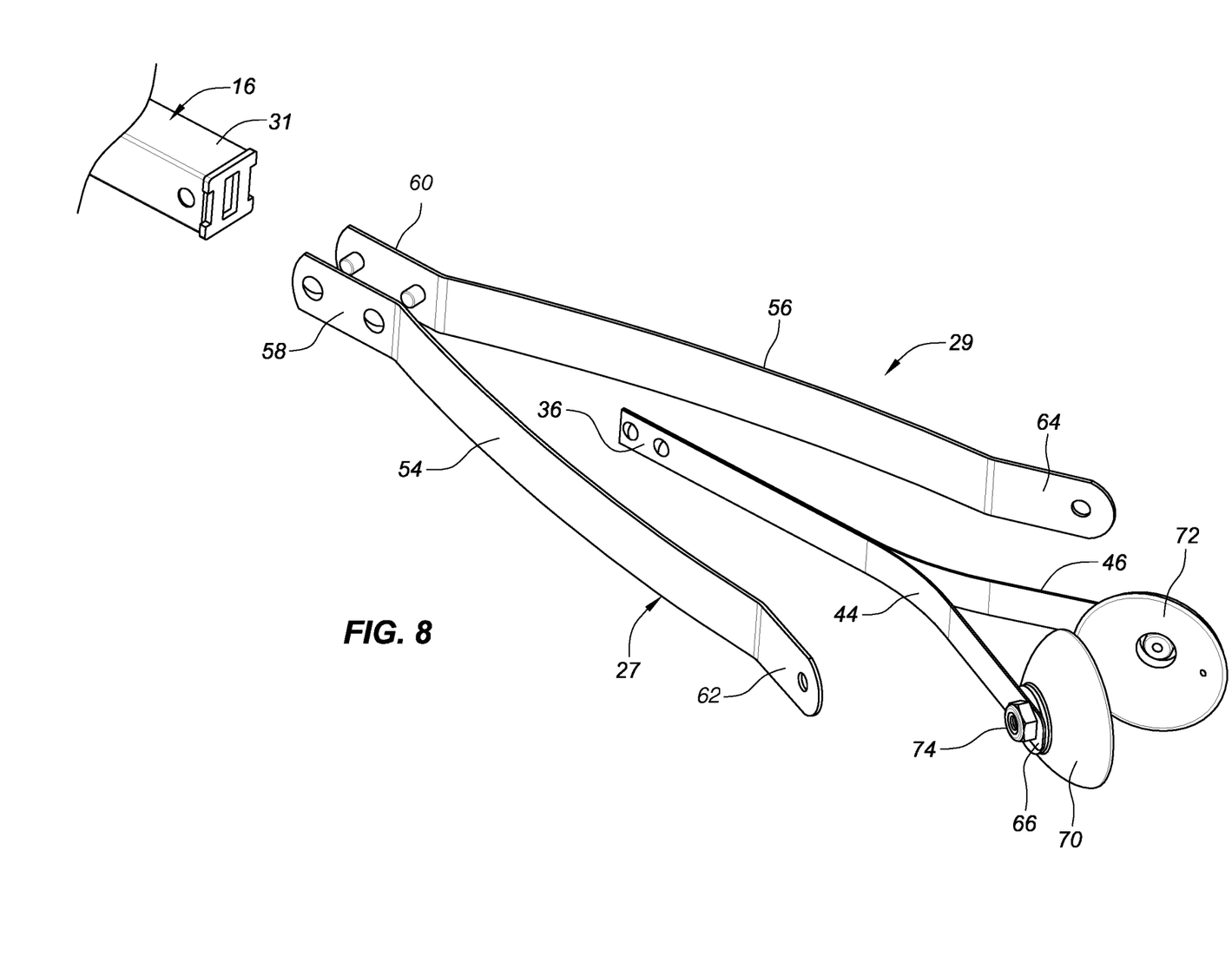
FIG. 8 is an enlarged, partial exploded view of the gripping end of the instant invention.

A plurality of openings 18 are provided in the first and second body portions 14, 16 for use in adjusting the assembly 10. A telescoping locking means or mechanism, an example of which is shown at 13, has a housing 15 that is preferably mounted over each telescoping joint on the body portions. The housing 15 has a locking pin 17 (see FIG. 7), secured to and operated by a lever 19, rotatably mounted on the housing 15, and acting against a biasing means, such as a leaf spring, or the like, not shown. When the lever 19 is actuated it moves the pin 17 into and out of selected openings 18 whereby the body portions may be moved with respect to each other and then locked in position. In this manner the overall length of the gripping device 10 may be easily adjusted to a desired length. Also, as needed, the length of housing 12 may be further adjusted at either or both joint 11, 11a, in the same manner.

All of the body portions include means, such as a rub stop or the like, added, formed or secured therein to prevent the body portions from being rotated with respect to each other and/or from being pulled apart when being adjusted.

The body portion 14 is preferably provided with an operating handle or holding element 24 held on or secured to an outer end 25 thereof, and the second body portion 16 is preferably provided with at least two movable gripping or holding elements 27, 29 held on a distal end 31 thereof.

Figure 6:
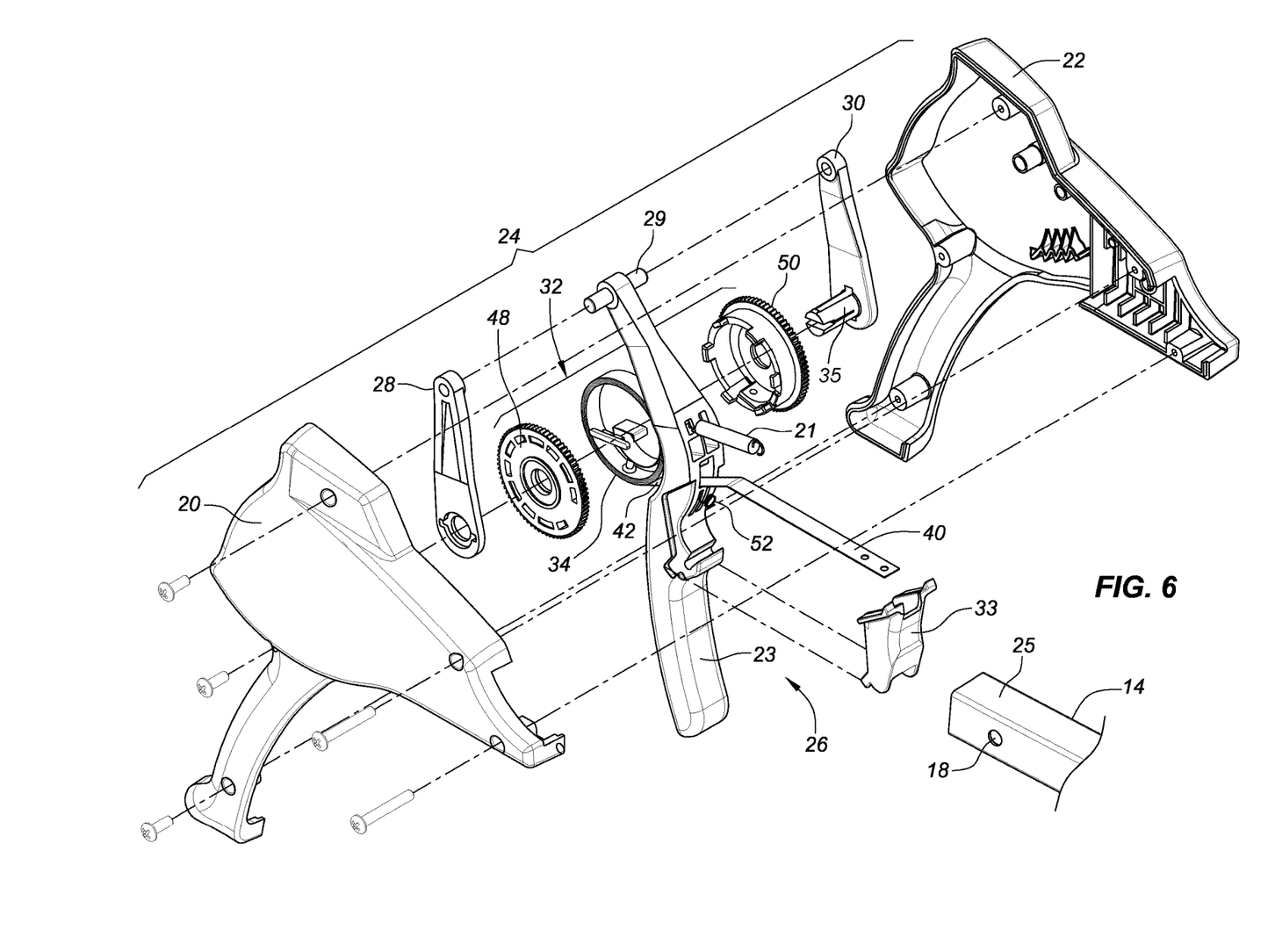
FIG. 6 is an enlarged, exploded view of the holding end.

The handle 24 includes a trigger assembly 26, preferably having a plurality of parts, including a winding mechanism, explained more fully below, rotatably mounted within outer housing elements 20, 22 (see FIG. 6). The trigger assembly 26 includes a trigger portion 23 rotatably mounted within a pair of pivot arms 28, 30 and the outer housing elements 20, 22 by a dowel, or the like 35. The trigger assembly 26 also includes a trigger lock 33 mounted thereon and acting against a compression spring 52 to lock and hold the trigger in a desired position during use of the device. Additionally, the trigger 23 is attached to an extension spring 21 secured to the interior of the outer housing 22, which spring is stretched when the trigger is actuated and returns the trigger to the rest position when the trigger is released.

A wind assembly or mechanism 32 is held in the handle 24 between the outer housing elements 20, 22 and the pivot arms 28, 30 of the trigger assembly 26, to allow controlled movement of a non-resilient, but flexible control link or element 40, having a first or inner end 42 wound into and/or held in a coil spring 34 in the inner portion of the wind assembly 32 in any known or desired manner, and a distal or outer end (not shown) secured to inner ends 36, 38 of flexible inner legs or portions 44, 46 of the gripping elements 27, 29. The inner legs 44, 46 are partially held in the body portion 16, to enable actuation of the gripping elements 27, 29, as described more fully below.

The wind assembly or mechanism 32 includes the coil spring 34 and gear segments 48, 50, held between the pivot arms 28, 30 of the trigger assembly 26 to allow controlled movement of the non-resilient, but flexible control link or element 40 and the gripping elements 27, 29. These gear segments and springs bias the trigger assembly into the rest position shown in FIG. 1, with the gripping elements 27, 29 held in the open or rest position.

Figure 1:
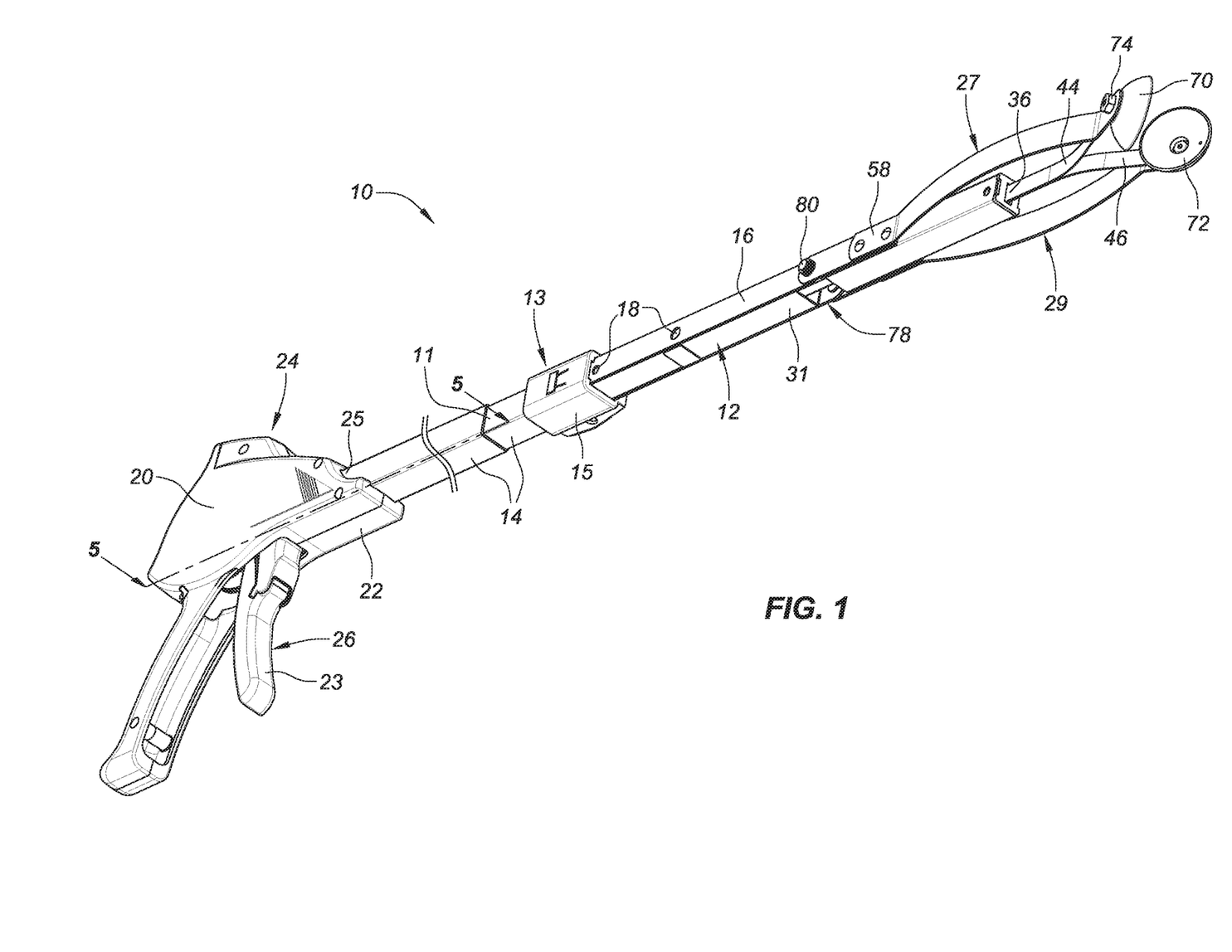
FIG. 1 is a perspective view, looking from below, of an assembled, adjustable gripping device of the instant invention.
Figure 2:
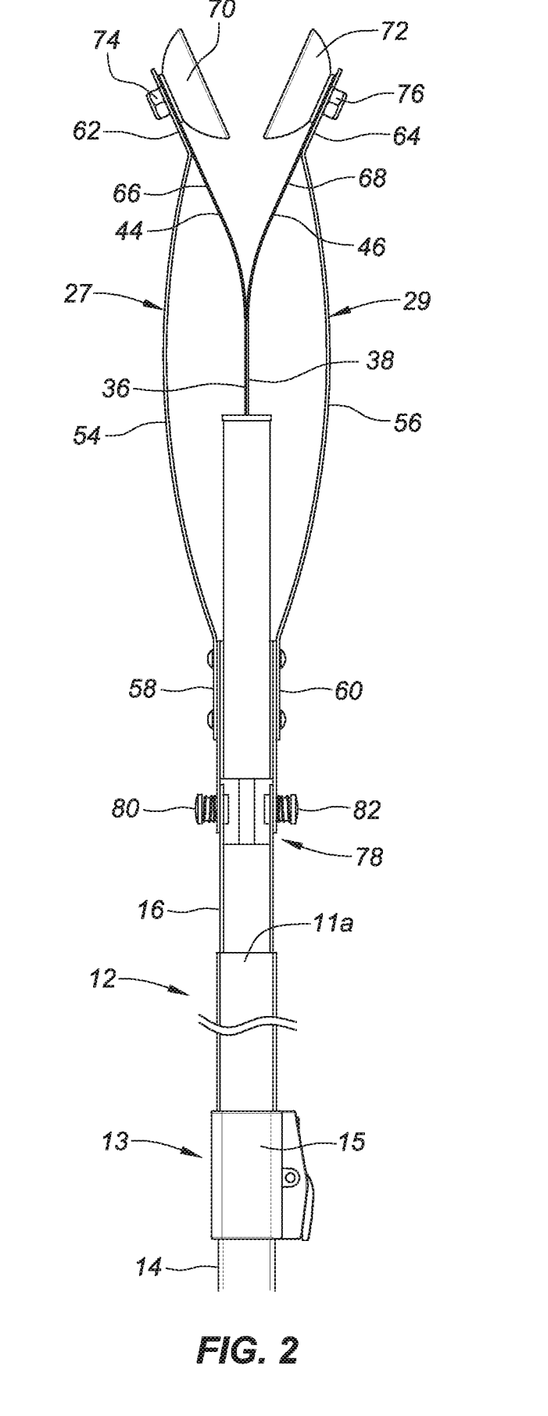
FIG. 2 is an enlarged, partial bottom plan view of the gripping end of the assembled device shown in FIG. 1.
Figure 3:
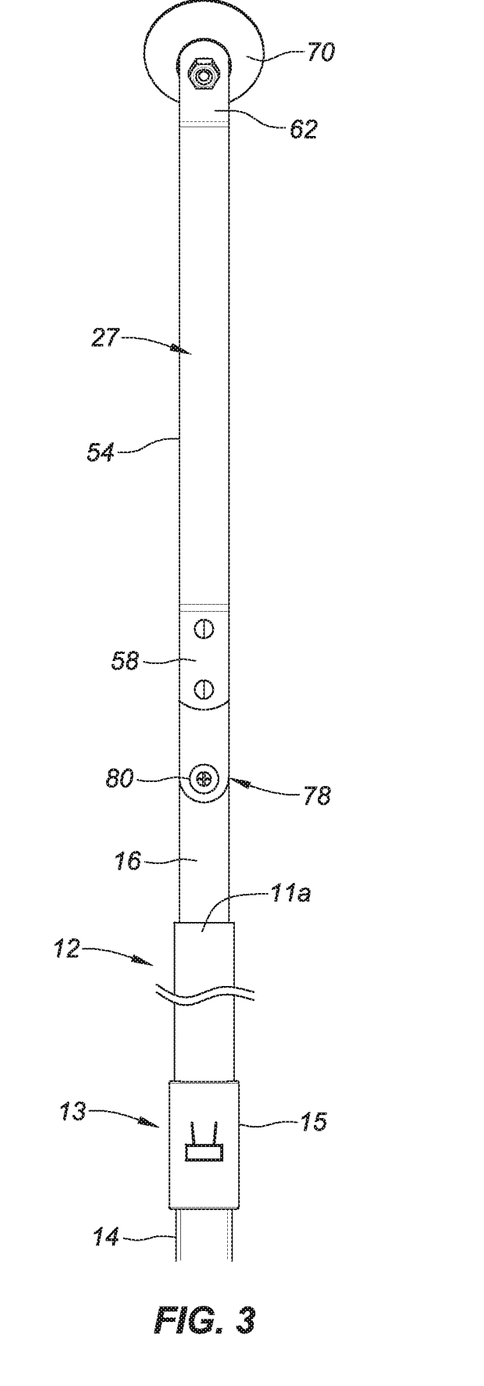
FIG. 3 is a right side elevational view of the gripping device shown in FIG. 2; the other side being substantially identical.
Figure 4:
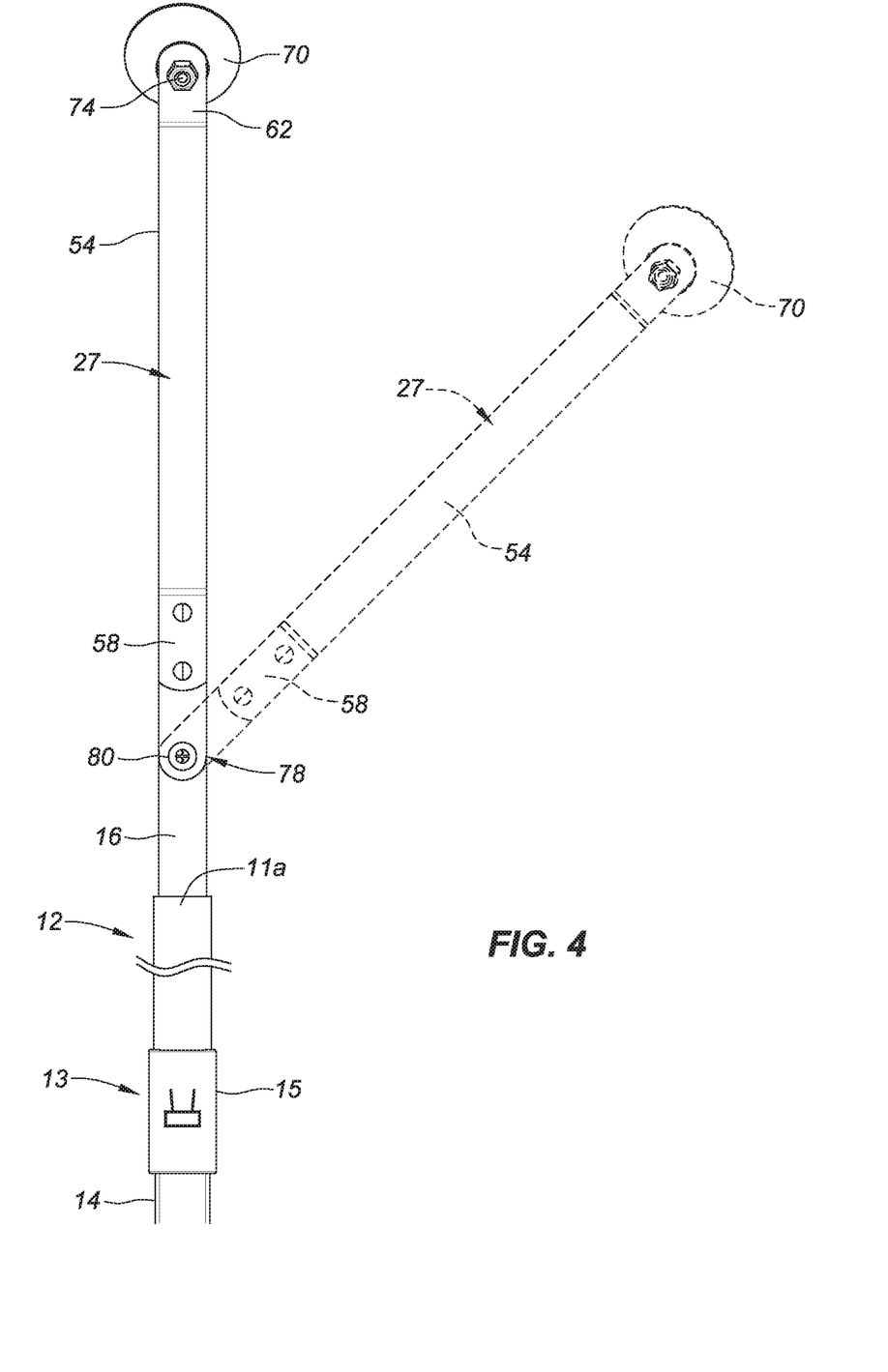
FIG. 4 is a further side elevational view of the gripping device, similar to FIG. 3, showing in broken line the outer gripping end adjusted or pivoted to a different angle.
Figure 5:
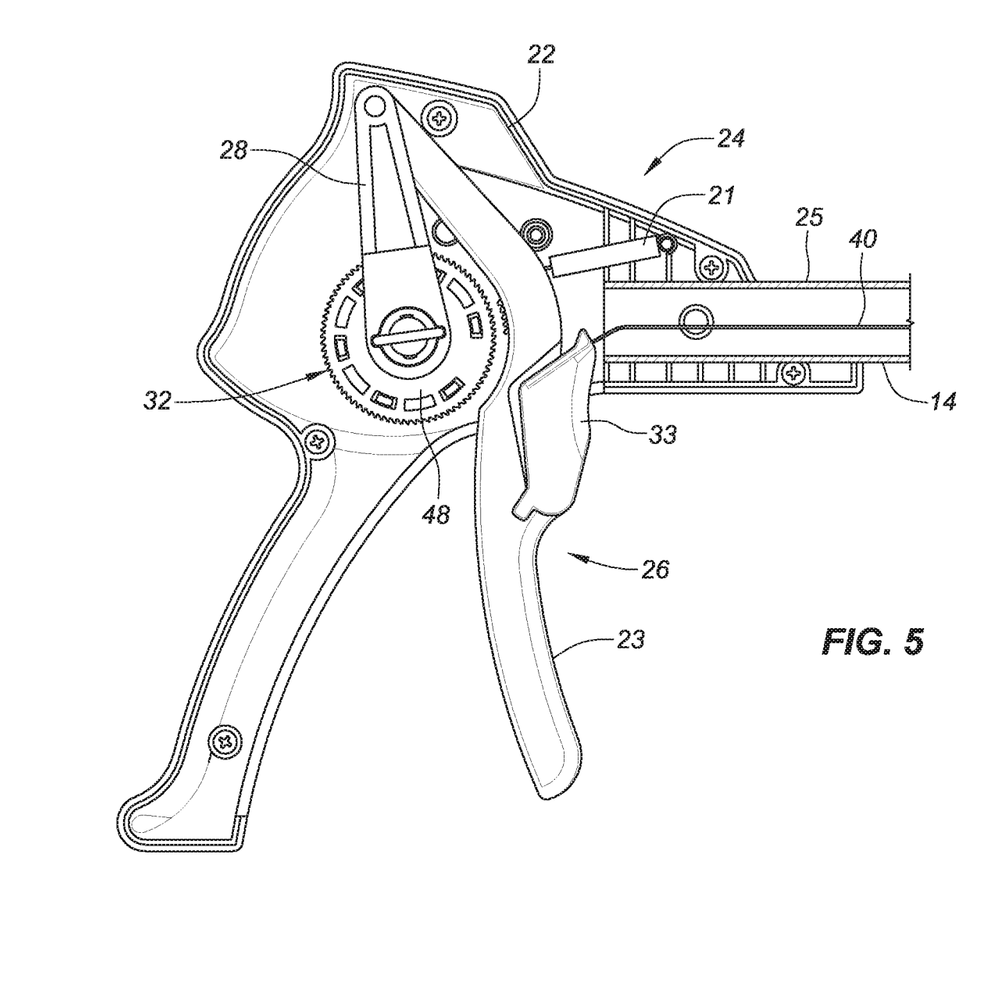
FIG. 5 is an enlarged cross-sectional view of the first or holding end of the device taken along line 5-5 in FIG. 1.

Each of the gripping elements 27, 29 includes an outer flexible, leaf spring-type portion 54, 56 normally biasing the gripping elements into the open position shown in FIGS. 1 and 2. The outer flexible, leaf spring-type portions 54, 56 have first or inner ends 58, 60 secured to the exterior surface of the body portion 16, preferably on opposite sides thereof. Second or upper ends 62, 64 of the flexible, leaf spring-type portions 54, 56 are secured to outer ends 66, 68 of the flexible inner legs or portions 44, 46 and to holding elements 70, 72, that may take any desired shape, such as bell shaped or suction cups. The first or inner ends 58, 60 of the outer flexible, leaf spring-type portions 54, 56 are preferably secured to the exterior surface of the lower body portion 16 by pins or rivets. Additionally, the second or upper ends 62, 64 of the flexible, leaf spring-type portions 54, 56 are preferably secured to the outer ends 66, 68 of the flexible inner legs or portions 44, 46 and to the holding elements 70, 72, by means of nuts and bolts, such as 74, 76.

As explained previously, the first end 42 of the non-resilient, flexible control element or link 40 is secured in the wind assembly or mechanism 32, for example, by having the first end secured to and/or wound around the coil spring 34, to allow the wind mechanism 32 to selectively roll or wind up, or unroll or release the non-resilient, flexible control element or link 40, as needed, when the adjustable elongated hollow body or housing 12 is either lengthened or shortened. It is to be understood that the non-resilient, flexible control element or link 40 is made from a thin sheet or strip of metal, plastic, reinforced fabric, or the like that will not stretch, but which is flexible and thin enough to be easily wound up by or unrolled by the wind mechanism 32.

As shown in FIGS. 1-4, the second body 16 includes a pivot joint 78 having spring loaded locking screws or elements 80, 82 on each side, whereby upon release by pushing the locking elements inwardly the end having the gripping elements 27, 29 thereon may be rotated up to 90 degrees to either side (total rotation of 180 degrees). This rotation of the gripping elements 27, 29 allows the gripping device 10 to be used to grasp and pick up items in hard to reach places.

The gripping device of the instant invention is operated in the same manner as the gripping device described in the '756 patent, except that the length of the device is more securely controlled by operation of the telescoping locking means or mechanism 13, as described above, and the gripping elements 27, 29 may be adjusted or pivoted up to 90 degrees on either side of the device, as also explained above.

The wind mechanism 32 operates in a similar but more positive manner and the operating trigger 23 is locked in place during operation by the trigger lock 33, as explained above.

It, therefore, can be seen that the present invention provides a new and improved telescoping adjustable gripping device that may be of any desired size, that may be handled by one or two hands of a user, that can have a gripping end which may be pivoted, and that can be manufactured at lower cost because of fewer parts. The device also includes an internal operating means actuable by a trigger assembly that is rotatably mounted in a handle at one end. The handle includes a wind mechanism to allow the gripping device body to be easily extended or shortened. The trigger mechanism is operated to open and close grasping or gripping elements held at a distal end of the device.

Those skilled in the art will appreciate that the above described preferred embodiments are subject to numerous modifications and adaptations without departing from the scope and spirit of the invention. Therefore, it is to be understood that, within the scope of the appended claims the invention may be practiced other than specifically described herein.

What is claimed is:

1. An adjustable gripping device, comprising:
an elongated hollow body having a first end and a second end comprised of at least two telescoping members with a telescoping lock mounted thereon to control the adjustment thereof, the telescoping lock having a housing encompassing a circumference of the telescoping members, with a lever mounted on housing and a pin secured to the lever, which pin upon operation of the lever is inserted into and out of selected openings formed in the telescoping members to allow the telescoping members to be moved with respect to each other and then locked in position to lengthen or shorten the adjustable gripping device, the housing including a pair of flanges extending along a length of the housing on a first side of the housing, with the lever mounted between the flanges, the flanges including outwardmost surfaces that slope away from the first side of the housing so as to reach a maximum distance from the first side of the housing at a midpoint of the length of the housing;
a handle secured to the first end having a movable trigger assembly;
the second end having a plurality of adjustable and movable gripping elements rotatably held thereon;
a flexible, non-resilient control link held in the elongated hollow body and connected between the movable trigger assembly and flexible leg portions of the gripping elements extending into the elongated hollow body;
a wind assembly held in the handle and connected between the movable trigger assembly and the flexible, non-resilient control link to control operation of the gripping elements when the movable trigger assembly is actuated.

2. The adjustable gripping device of claim 1 wherein the second end includes a pivoting joint to allow the gripping elements to be pivoted around the second end.

3. The adjustable gripping device of claim 2 wherein the pivoting joint includes a pair of locking elements that are actuated to allow the gripping elements to be pivoted around the second end in a selected direction.

4. The adjustable gripping device of claim 3 wherein the movable trigger assembly has a trigger lock thereon that cooperates with the trigger to lock it in an operating position during use of the adjustable gripping device.

5. An adjustable gripping device having a plurality of pickup elements, comprising:
an elongated hollow body having a first end and a second end comprised of at least two adjustable telescoping members;
a handle secured to the first end, the handle comprising outer housing elements, and a movable trigger assembly held in the handle, the movable trigger assembly including a trigger portion extending out of the handle, the trigger portion mounted within a pair of pivot arms within the outer housing elements, the trigger portion including an arcuate portion at least partly within the outer housing elements, with the arcuate portion attached to a first spring secured to a post of an interior surface of a one of the outer housing elements, such that the first spring is stretched when the trigger portion is actuated;
the second end having a plurality of adjustable and movable gripping elements rotatably held thereon; a flexible, non-resilient control link held in the elongated hollow body and connected between the movable trigger assembly and flexible leg portions of the gripping elements extending into the elongated hollow body;
a wind assembly held in the handle, and held between the pair of pivot arms, and connected between the movable trigger assembly and the flexible, non-resilient control link to control operation of the gripping elements when the movable trigger assembly is actuated; and
the movable trigger assembly having a trigger lock mounted on the trigger portion, and positioned to act against a second spring, to cooperate with the trigger assembly and lock it in place during use.

6. The adjustable gripping device of claim 5 wherein the at least two adjustable telescoping members have telescoping locking means mounted thereon to control the adjustment thereof.

7. The adjustable gripping device of claim 6 wherein the telescoping locking means have a housing with a lever mounted thereon and a pin secured to the lever, which pin, upon operation of the lever is inserted into and out of selected openings formed in the least two telescoping members to be moved with respect to each other and then locked in position to lengthen or shorten the adjustable gripping device.

8. The adjustable gripping device of claim 7 wherein the second end includes a pivoting joint to allow the gripping elements to be pivoted around the second end.

9. The adjustable gripping device of claim 8 wherein the pivoting joint includes a pair of locking elements that are actuated to allow the gripping elements to be pivoted around the second end in a selected direction.

10. An adjustable gripping device having a pair of gripping elements, comprising:
an elongated hollow body having a first end and a second end comprised of a first body portion and a second body portion adjustably telescoped together;
a telescoping lock mounted over the first body portion and the second body portion to control the adjustment thereof, the telescopic lock having a housing encompassing a circumference of the first body portion and the second body portion, the housing including a pair of flanges extending along a length of the housing on a first side of the housing, with a lever mounted between the flanges, the flanges including outwardmost surfaces that slope away from the first side of the housing so as to reach a maximum distance from the first side of the housing at a midpoint of the length of the housing;
a handle secured to the first end and a movable trigger assembly held in the handle, the handle comprising outer housing elements, the movable trigger assembly including a trigger portion extending out of the handle, the trigger portion mounted within a pair of pivot arms within the outer housing elements, the trigger portion including an arcuate portion at least partly within the outer housing elements, with the arcuate portion attached to a first spring secured to a post of an interior surface of a one of the outer housing elements, such that the first spring is stretched when the trigger portion is actuated;
the second end having the pair of gripping elements rotatably held thereon;
a flexible, non-resilient control link held in the elongated hollow body and connected between the movable trigger assembly and flexible leg portions of the pair of gripping elements;
the flexible leg portions having ends which extend into the elongated hollow body and which are attached to a first end of the non-resilient control link;

the movable trigger assembly having a trigger lock, positioned to act against a second spring, mounted on the trigger portion;

a wind assembly held in the handle between the pair of pivot arms, and connected between the movable trigger assembly and a second end of the flexible, non-resilient control link to control operation of the pair of gripping elements when the trigger assembly is moved into the handle.

11. The adjustable gripping device of claim 10 wherein the second end of the elongated hollow body includes a pivoting joint to allow the gripping elements to be pivoted around the second end.

12. The adjustable gripping device of claim 11 wherein the pivoting joint includes a pair of locking elements that are actuated to allow the gripping elements to be pivoted around the second end of the elongated hollow body in a selected direction.

13. An adjustable gripping device having a pair of gripping elements, comprising:

an elongated hollow body having a first end and a second end comprised of a first body portion and a second body portion adjustably telescoped together;

a telescoping lock mounted over the first body portion and the second body portion to control the adjustment thereof, the telescoping lock having a housing with a lever mounted thereon and a pin secured to the lever, which pin, upon operation of the lever is inserted into and out of selected openings formed in the first body portion and the second body portion to allow the first body portion and the second body portion to be moved with respect to each other and then locked in position to lengthen or shorten the adjustable gripping device, the housing encompassing a circumference of the first body portion and the second body portion, the housing including a pair of flanges extending along a length of the housing on a first side of the housing, with the lever mounted between the flanges, the flanges including outwardmost surfaces that slope away from the first side of the housing so as to reach a maximum distance from the first side of the housing at a midpoint of the length of the housing;

a handle secured to the first end and a movable trigger assembly held in the handle, the handle comprising outer housing elements, the movable trigger assembly including a trigger portion extending out of the handle, the trigger portion mounted within a pair of pivot arms within the outer housing elements, the trigger portion including an arcuate portion at least partly within the outer housing elements, with the arcuate portion attached to a first spring secured to a post of an interior surface of a one of the outer housing elements, such that the first spring is stretched when the trigger portion is actuated;

the second end having the pair of gripping elements rotatably held thereon;

a flexible, non-resilient control link held in the elongated hollow body and connected between the movable trigger assembly and flexible leg portions of the pair of gripping elements;

the flexible leg portions having ends which extend into the elongated hollow body and which are attached to a first end of the non-resilient control link;

the movable trigger assembly having a trigger lock mounted on the trigger portion;

a wind assembly held in the handle and connected between the movable trigger assembly and a second end of the flexible, non-resilient control link to control operation of the pair of gripping elements when the trigger assembly is actuated; and the second end includes a pivoting joint with a pair of spring loaded locking elements that are actuated to allow the gripping elements to be pivoted around the second end in a selected direction.

* * * * *